Aug. 14, 1934. C. C. FARMER 1,969,786
PISTON ROD COLLAR
Filed Aug. 31, 1932
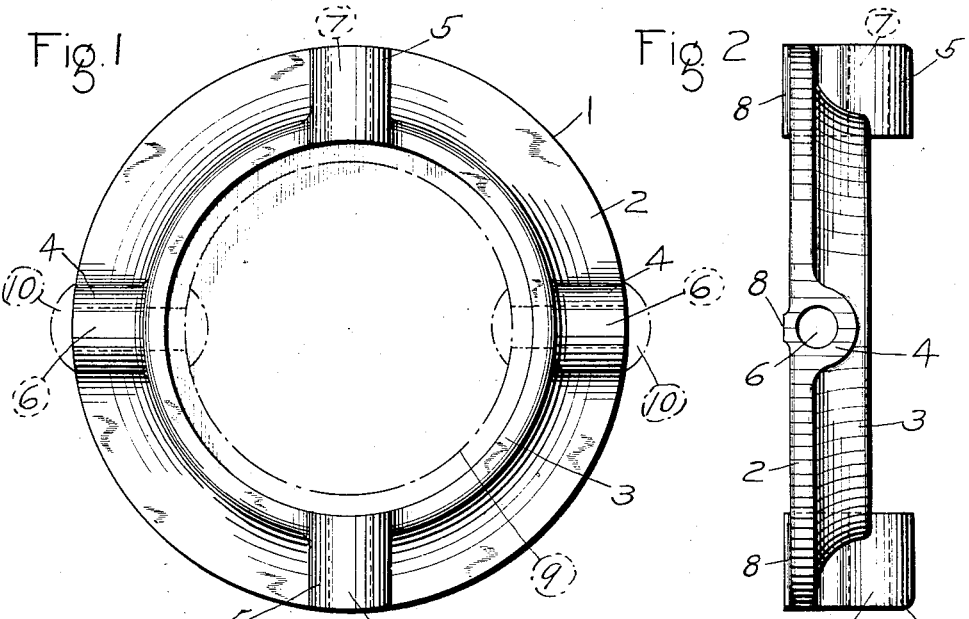
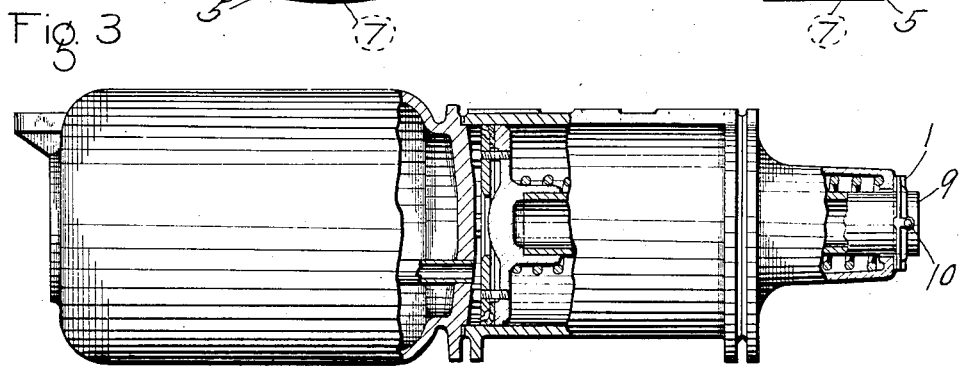
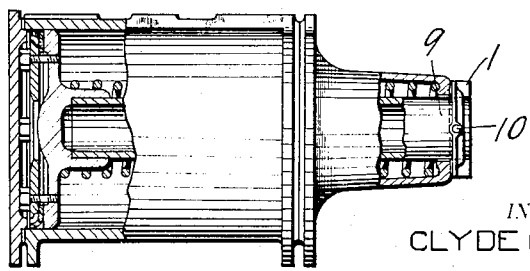
INVENTOR.
CLYDE C. FARMER.
BY Wm. M. Cady
ATTORNEY.

Patented Aug. 14, 1934

1,969,786

UNITED STATES PATENT OFFICE 1,969,786

PISTON ROD COLLAR

Clyde C. Farmer, Pittsburgh, Pa., assignor to The Westinghouse Air Brake Company, Wilmerding, Pa., a corporation of Pennsylvania Application August 31, 1932, Serial No. 631,190

1 Claim. (Cl. 60—62.6)

This invention relates to brake cylinders for fluid pressure brake equipments and more particularly to brake cylinders having a hollow push rod.

When removing the piston from the brake cylinder of the usual type for inspection, cleaning, or repair, it is necessary to first remove the non-pressure head. When the bolts securing the head to the cylinder body are removed, the release spring, being under compression between the piston and the non-pressure head, will tend to throw the head off the hollow push rod. In order to prevent this occurrence, it is common practice to provide a pin which extends through holes provided in the exposed end of the hollow push rod, the pin serving as a stop for preventing the non-pressure head being thrown off the rod. It has also been proposed to provide a collar which is permanently secured to the hollow push rod at its exposed end by means of rivets or set screws which engage with the hollow rod within the above mentioned holes, the collar acting as a stop when dismantling the cylinder, as well as preventing the free entrance of water and foreign matter into the brake cylinder when the piston is in release position.

In the combined type of brake equipment, that is, where the brake cylinder and the auxiliary reservoir are secured together in such a manner that the head of the auxiliary reservoir forms the pressure head of the brake cylinder against which the piston stops in release position, the head of the reservoir extends into the bore of the brake cylinder and stops the piston in a position somewhat closer to the non-pressure head than in the detached type of equipment, that is, where the brake cylinder is separated from the auxiliary reservoir and has a separate pressure head, because in the latter instance the inner face of the pressure head is recessed where it stops the piston in release position. Inasmuch as the above mentioned holes in the hollow push rod of both the combined and detached types of equipment are spaced equally distant from the piston, it will be seen that said holes are located farther away from the end of the non-pressure head in the combined type of equipment than in the detached type. Therefore, when it is desired to utilize the holes now provided in the hollow push rod, for securing the collar to the push rod, two types of collars would be required, one adapted to be used with the combined type of equipment and the other with the detached type of equipment, the only difference being in the longitudinal disposition of the rivet holes in the collar.

The object of my invention is to provide a collar adapted to be permanently secured to the exposed end of the hollow push rod of a brake cylinder for preventing the release spring of the non-pressure head assembly from throwing the non-pressure head off the rod and for preventing the free entrance of water and foreign matter into the brake cylinder when the piston is in release position, regardless of whether the brake cylinder be of the combined or detached type.

Other objects and advantages will appear in the following more detailed description of the invention.

In the accompanying drawing: Fig. 1 is a face view of a collar embodying my invention; Fig. 2 a side view thereof; Fig. 3, a view, partly in section, of the combined type of auxiliary reservoir and brake cylinder, showing my invention applied to the hollow push rod; and Fig. 4 a view, partly in section, of a brake cylinder of the detached type, showing my invention applied to the hollow push rod thereof.

According to the construction, I provide a collar 1, which is in the form of an annular ring adapted to closely slip fit over the hollow push rod 9. Said ring may comprise an annular flange 2 and a concentrically disposed annular rib 3 extending outwardly from one face of said flange, the bore of the rib portion being substantially the same as that of the flange portion. On the rib face of the collar there are provided two pairs of lugs 4 and 5, respectively, the lugs 4 having diametrically aligned openings 6 adapted to register with corresponding openings in the hollow push rod of a brake cylinder of the detached type, and the lugs 5 having diametrically aligned openings 7, located outwardly from the openings 6 of the lugs 4 and adapted to register with corresponding openings in the hollow push rod of a brake cylinder of the combined type.

On the face of the flange opposite the face having the rib 3, pads 8 are provided which may engage the outer end of the non-pressure head or be spaced a slight distance therefrom when the piston is in release position.

When it is desired to apply the collar, said collar is slipped over the exposed end of the push rod 9 and positioned in such a manner that, in the combined type of equipment, the openings 7 register with the openings in the push rod, after which a rivet 10 is inserted through the registering openings and then riveted over, thus securing the collar to the push rod. In applying the collar to a push rod of a detached type of brake cylinder, the collar is positioned so that the openings 6 in the collar register with the openings in the push rod.

Thus, it will be seen, that for the purpose of preventing the release spring of a brake cylinder from throwing the non-pressure head off the push rod, when disassembling the brake cylinder, and preventing the free entrance of water and dirt into the brake cylinder when the piston is in release position, I provide a collar which is adapted to be applied to the push rod of a brake cylinder of either the combined or detached type by reason of the fact that two pairs of openings are provided in the collar for receiving rivets or any other desired means for securing the collar to the push rod, one pair of openings being adapted to be used in the case of the combined type of brake cylinder and the other pair in the case of the detached type of brake cylinder.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

The combination with a fluid pressure brake cylinder, of a piston in said cylinder, a non-pressure head for said cylinder having an opening, and a piston rod connected to said piston and extending through said opening, of a collar mounted on said rod comprising an annular portion having an opening formed therein adapted to register with an opening usually provided in the piston rod, and a lug extending outwardly from said annular portion and having an opening formed therein also adapted to register with said opening in the piston rod, said opening in the annular portion and in the lug being disposed in different longitudinal planes, and a securing element adapted to extend through either the opening in the annular portion or in the lug and the opening in the piston rod for securing said collar to said piston rod at different longitudinal distances from said piston.

CLYDE C. FARMER.